United States Patent
Feng et al.

(10) Patent No.: US 11,651,715 B2
(45) Date of Patent: May 16, 2023

(54) CHARGING CIRCUITRY, DISPLAY DEVICE, WEARABLE DEVICE, AND DISPLAY DRIVING METHOD AND DEVICE

(71) Applicants: Beijing BOE Display Technology Co., Ltd., Beijing (CN); BOE Technology Group Co., Ltd., Beijing (CN)

(72) Inventors: Yilin Feng, Beijing (CN); Wei Sun, Beijing (CN); Lianghao Zhang, Beijing (CN); Xin Duan, Beijing (CN); Wenchao Han, Beijing (CN); Zhaohui Meng, Beijing (CN); Li Tian, Beijing (CN); Xinle Wang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/762,691

(22) PCT Filed: May 19, 2021

(86) PCT No.: PCT/CN2021/094515
§ 371 (c)(1),
(2) Date: Mar. 22, 2022

(87) PCT Pub. No.: WO2022/001443
PCT Pub. Date: Jan. 6, 2022

(65) Prior Publication Data
US 2022/0358868 A1 Nov. 10, 2022

(30) Foreign Application Priority Data
Jun. 28, 2020 (CN) .......................... 202010599097.8

(51) Int. Cl.
*G09G 3/20* (2006.01)
*G06F 3/041* (2006.01)

(52) U.S. Cl.
CPC ............. *G09G 3/20* (2013.01); *G06F 3/0412* (2013.01); *G09G 2300/0426* (2013.01);
(Continued)

(58) Field of Classification Search
None
See application file for complete search history.

(56) References Cited

U.S. PATENT DOCUMENTS

| 9,269,321 B2 | 2/2016 | Jamshidi-Roudbari et al. |
| 2014/0118329 A1* | 5/2014 | Byun ................. G09G 5/006 345/212 |

(Continued)

FOREIGN PATENT DOCUMENTS

| CN | 106023931 A | 10/2016 |
| CN | 108665844 A | 10/2018 |

(Continued)

OTHER PUBLICATIONS

PCT/CN2021/094515 international search report and written opinion.

*Primary Examiner* — Ifedayo B Iluyomade
(74) *Attorney, Agent, or Firm* — IPro, PLLC (57) ABSTRACT

The present disclosure provides a charging circuitry, a display device, a wearable device, a display driving method and a display driving device. The charging circuitry includes: a driving sub-circuitry configured to receive an image signal and convert the image signal into a display driving signal to be outputted to a data line of the array substrate; a circuitry power supply voltage end configured to apply a direct current voltage to the driving sub-circuitry; and a switch sub-circuitry arranged on a connection circuitry between the circuitry power supply voltage end and the driving sub-circuitry, and configured to be switched between a first state where the circuitry power supply voltage end is electrically coupled to the driving sub-circuitry and a second
(Continued)

state where the circuitry power supply voltage end is electrically decoupled from the driving sub-circuitry.

17 Claims, 3 Drawing Sheets

(52) U.S. Cl.
CPC .............. *G09G 2300/0819* (2013.01); *G09G 2310/0291* (2013.01); *G09G 2310/0297* (2013.01); *G09G 2310/061* (2013.01); *G09G 2310/08* (2013.01); *G09G 2320/0252* (2013.01); *G09G 2330/021* (2013.01); *G09G 2354/00* (2013.01)

(56) References Cited

U.S. PATENT DOCUMENTS

| | | | |
|---|---|---|---|
| 2019/0121476 A1* | 4/2019 | Jang | ........................ G09G 3/20 |
| 2020/0090596 A1 | 3/2020 | Oh et al. | |
| 2020/0152121 A1 | 5/2020 | Sung | |

FOREIGN PATENT DOCUMENTS

| | | | |
|---|---|---|---|
| CN | 109696984 | A | 4/2019 |
| CN | 110930952 | A | 3/2020 |
| CN | 111179845 | A | 5/2020 |
| CN | 111341262 | A | 6/2020 |

\* cited by examiner

Fig. 3 within a charging period for the data line, transmitting a first switch control signal to the switch sub-circuitry within a first time period to enable the switch sub-circuitry to be in one of the first state and the second state, and transmitting a second switch control signal to the switch sub-circuitry within a second time period subsequent to the first time period to enable the switch sub-circuitry to be in the other one of the first state and the second state  ~S410

CHARGING CIRCUITRY, DISPLAY DEVICE, WEARABLE DEVICE, AND DISPLAY DRIVING METHOD AND DEVICE

CROSS-REFERENCE TO RELATED APPLICATION

This application is the U.S. national phase of PCT Application No. PCT/CN2021/094515 filed on May 19, 2021, which claims a priority of the Chinese patent application No. 202010599097.8 filed on Jun. 28, 2020, which is incorporated herein by reference in its entirety.

TECHNICAL FIELD

The present disclosure relates to the field of display technology, in particular to a charging circuitry, a display device, a wearable device, a display driving method and a display driving device.

BACKGROUND

With the development of the display technology, touch display devices have been widely used. Generally, a touch panel and a display panel in the touch display device are controlled by two chips independently. In order to improve integration of the touch display device, a Touch and Display Driver Integration (TDDI) chip has emerged.

For the display device with the TDDI chip, a touch function and a display function are integrated. In a process of outputting an image, it is necessary to allocate an image output time period and a touch reading time period, and the display device is in an idle state within a part of time period after charging, resulting in power consumption. Therefore, how to achieve low power consumption performance of a display product with the TDDI chip has become a research focus of the current display device.

SUMMARY

An object of the present disclosure is to provide a charging circuitry, a display device, a wearable device, a display driving method and a display driving device, so as to achieve low power consumption performance of a display product.

In one aspect, the present disclosure provides in some embodiments a charging circuitry for an array substrate, including: a driving sub-circuitry configured to receive an image signal and convert the image signal into a display driving signal to be outputted to a data line of the array substrate; a circuitry power supply voltage end configured to apply a direct current voltage to the driving sub-circuitry; and a switch sub-circuitry arranged on a connection circuitry between the circuitry power supply voltage end and the driving sub-circuitry, and configured to be switched between a first state where the circuitry power supply voltage end is electrically coupled to the driving sub-circuitry and a second state where the circuitry power supply voltage end is electrically decoupled from the driving sub-circuitry.

In a possible embodiment of the present disclosure, the switch sub-circuitry includes a multiplexer.

In a possible embodiment of the present disclosure, the driving sub-circuitry includes: a booster unit coupled to the switch sub-circuitry, and configured to receive a voltage applied by the circuitry power supply voltage end and convert the voltage applied by the circuitry power supply voltage end into a predetermined voltage when the switch sub-circuitry is in the first state; a timer control register configured to receive the image signal and convert the image signal into a timer control signal; and an amplification unit including an output end and at least two input ends, the booster unit and the timer control register being coupled to the input ends respectively, and the amplification unit being configured to amplify the timer control signal outputted by the timer control register when a voltage applied by the booster unit is the predetermined voltage, so as to enable the output end to output the display driving signal.

In a possible embodiment of the present disclosure, the timer control register is coupled to the switch sub-circuitry, and further configured to transmit a switch control signal to the switch sub-circuitry to enable the switch sub-circuitry to be switched between the first state and the second state in accordance with the switch control signal.

In a possible embodiment of the present disclosure, the charging circuitry further includes a feedback unit coupled to the output end of the amplification unit and one input end of the amplification unit.

In another aspect, the present disclosure provides in some embodiments a display device including an array substrate and the above-mentioned charging circuitry. The array substrate is provided with at least one data line, and the driving sub-circuitry is coupled to the at least one data line of the array substrate.

In yet another aspect, the present disclosure provides in some embodiments a wearable device including the above-mentioned display device.

In still yet another aspect, the present disclosure provides in some embodiments a display driving method for the above-mentioned display device, including, within a charging period for the data line, transmitting a first switch control signal to the switch sub-circuitry within a first time period to enable the switch sub-circuitry to be in one of the first state and the second state, and transmitting a second switch control signal to the switch sub-circuitry within a second time period subsequent to the first time period to enable the switch sub-circuitry to be in the other one of the first state and the second state.

In a possible embodiment of the present disclosure, the charging period is a charging period for a gate line of the array substrate, the first switch control signal is used to enable the switch sub-circuitry to be in the second state, and the second switch control signal is used to enable the switch sub-circuitry to be in the first state.

In a possible embodiment of the present disclosure, the charging period is a charging period for an image of the array substrate, the first switch control signal is used to enable the switch sub-circuitry to be in the first state, and the second switch control signal is used to enable the switch sub-circuitry to be in the second state.

In a possible embodiment of the present disclosure, a time length of the first time period is the same as a charging time length from a time when a first gate line of the array substrate starts to be charged to a time when a last gate line of the array substrate has been charged.

In a possible embodiment of the present disclosure, a time length of the second time period is the same as a charging time length for charging the data line within the charging period of a gate line.

In still yet another aspect, the present disclosure provides in some embodiments a display driving device for the above-mentioned display device, including a control module configured to, within a charging period for the data line, transmit a first switch control signal to the switch sub-circuitry within a first time period to enable the switch sub-circuitry to be in one of the first state and the second state, and transmit a second switch control signal to the switch sub-circuitry within a second time period subsequent to the first time period to enable the switch sub-circuitry to be in the other one of the first state and the second state.

BRIEF DESCRIPTION OF THE DRAWINGS

In order to illustrate the technical solutions of the embodiment of the present disclosure in a clearer manner, the drawings desired for the embodiment of the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments.

Figure 1:
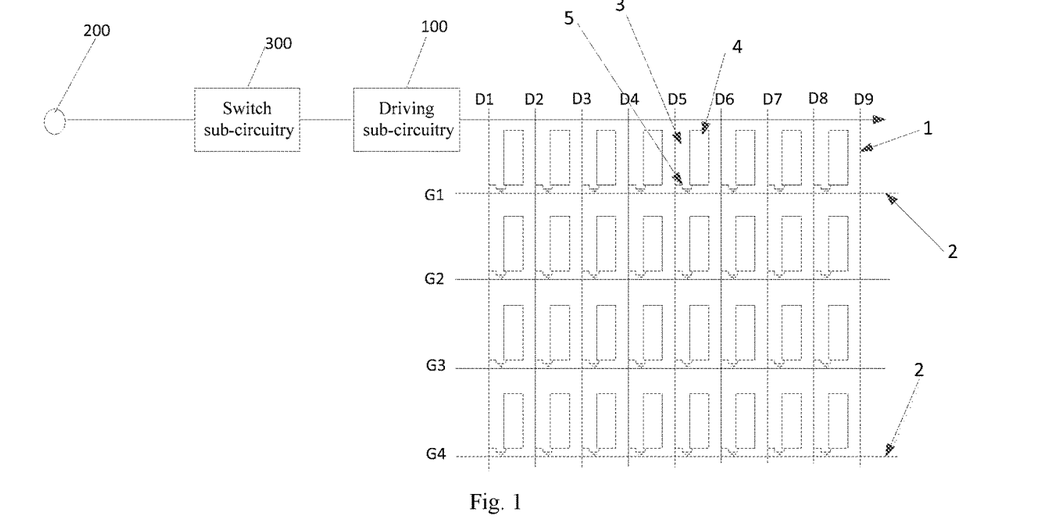
FIG. 1 is a schematic view showing a charging circuitry according to one embodiment of the present disclosure.

In order to achieve low power consumption performance of a display product, the present disclosure provides in some embodiments a charging circuitry for an array substrate which, as shown in FIG. 1, includes: a driving sub-circuitry 100, configured to receive an image signal and convert the image signal into a display driving signal to be outputted to a data line of the array substrate; a circuitry power supply voltage VCC end 200, configured to apply a direct current voltage to the driving sub-circuitry 100; and a switch sub-circuitry 300, arranged on a connection circuitry between the VCC end 200 and the driving sub-circuitry 100, and configured to be switched between a first state where the VCC end 200 is electrically coupled to the driving sub-circuitry 100 and a second state where the VCC end 200 is electrically decoupled from the driving sub-circuitry 100.

According to the charging circuitry in the embodiments of the present disclosure, through the switch sub-circuitry 300 on the connection circuitry between the VCC end 200 and the driving sub-circuitry 100, the switch sub-circuitry 300 may control the VCC end 200 to be electrically coupled to or electrically decoupled from the driving sub-circuitry 100 within a charging period for the data line. As a result, the driving sub-circuitry 100 may charge the data line of the array substrate and then be turned off within a time period after the data line has been charged, so as to effectively reduce the power consumption.

In the embodiments of the present disclosure, the switch sub-circuitry 300 includes a multiplexer MUX. The VCC end 200 is electrically coupled to or electrically decoupled from the driving sub-circuitry 100 through one selection of the multiplexer MUX.

Figure 2:
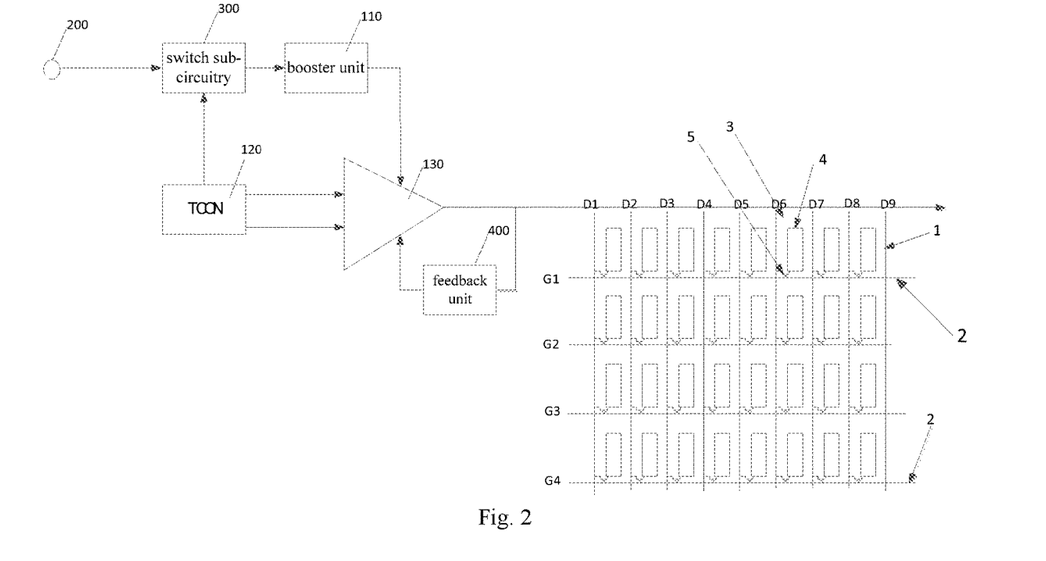
FIG. 2 is another schematic view showing the charging circuitry according to one embodiment of the present disclosure.

In the embodiments of the present disclosure, as shown in FIG. 2, in the charging circuitry, the driving sub-circuitry 100 includes: a booster unit 110, coupled to the switch sub-circuitry 300, and configured to receive a voltage applied by the VCC end 200 and convert the voltage applied by the VCC end 200 into a predetermined voltage when the switch sub-circuitry 300 is in the first state; a timer control register (TCON) 120, configured to receive the image signal and convert the image signal into a timer control signal; and an amplification unit 130, including an output end and at least two input ends, the booster unit 110 and the timer control register TCON 120 being coupled to the input ends of the amplification unit 130 respectively, and the amplification unit 130 being configured to amplify the timer control signal outputted by the timer control register TCON 120 when a voltage applied by the booster unit 110 is the predetermined voltage, so as to enable the output end to output the display driving signal.

When the switch sub-circuitry 300 is in the second state, the switch sub-circuitry 300 is turned off, and the voltage applied by the VCC end 200 is not transmitted to the booster unit 110. Hence, in the second state, the booster unit 100 is in a power-saving mode. Further, in the second state, the booster unit 110 may not convert the voltage applied by the VCC end 200 into the predetermined voltage to be applied to the amplification unit 130, and a circuitry of the amplification unit 130 for signal amplification is turned off, so the amplification unit 110 does not operate and is in the power-saving mode.

Based on the above, the switch sub-circuitry 300 controls the VCC end 200 to be electrically coupled to or electrically decoupled from the driving sub-circuitry 100, so as to enable the booster unit 110 and the amplification unit 130 to be switched between an operation mode and a non-operation mode, thereby to meet the requirement on the power-saving mode.

In a possible embodiment of the present disclosure, the timer control register TCON 120 is coupled to the switch sub-circuitry 300, and further configured to transmit a switch control signal to the switch sub-circuitry 300 to enable the switch sub-circuitry 300 to be switched between the first state and the second state in accordance with the switch control signal.

In the embodiments of the present disclosure, in addition to receiving the image signal and converting the image signal into the timer control signal, the timer control register TCON 120 is further configured to transmit the switch control signal to the switch sub-circuitry 300 to turn on or off the switch sub-circuitry 300.

In a possible embodiment of the present disclosure, the voltage applied by the VCC end 200 is 1.8V, and the booster unit 110 boosts the voltage applied by the VCC end 200 to 6V, i.e., the predetermined voltage is 6V.

In a possible embodiment of the present disclosure, as shown in FIG. 2, the charging circuitry further includes a feedback unit 40 coupled to the output end of the amplification unit 130 and one input end of the amplification unit 130.

Through the feedback unit 400 between the output end and one input end of the amplification unit 130, a signal from the output end of the amplification unit 130 is fed back to the input end, so that the amplification unit 130 performs signal modulation in accordance with the signal from the output end to ensure the accuracy of the output signal.

It should be appreciated that, when the amplification unit 130 is in a non-operation power-saving mode, no signal is outputted from the output end of the amplification unit 130, so the feedback unit 400 is also in the non-operation power-saving mode. In this way, it is able meet the requirement on the power-saving mode.

In the embodiments of the present disclosure, in order to indicate a connection relationship between the timer control register TCON 120 and the amplification unit 130, the charging circuitry is simplified. It should be appreciated that, in the charging circuitry of the actual array substrate, a plurality of electronic devices is further arranged between the timer control register TCON 120 and the amplification unit 130.

To be specific, the driving sub-circuitry 100 further includes a source driver and a gate driver (not shown) coupled between the timer control register TCON 120 and the amplification unit 130. The source driver is coupled to data lines D1, D2, . . . , Dn of the array substrate through the amplification unit 130, and configured to control source electrodes of thin film transistors on the array substrate. The gate driver is coupled to gate lines G1, G2, . . . , Gn, and configured to control gate electrodes of the thin film transistors on the array substrate.

The timer control register TCON 120 receives the image signal, e.g., a Low Voltage Differential Signal (LVDS), generates a time pulse signal, a control signal and a to-be-displayed data signal in accordance with the received LVDS, transmits the time pulse signal and the control signal to the source driver, and transmits the data signal to the gate driver.

The source driver converts the received data signal into an analog voltage driving signal in accordance with the timing pulse and the control signal. The analog voltage driving signal is amplified by the amplification unit 130 and transmitted to the data line of the array substrate, so as to input the voltage driving signal to the data line, thereby to enable a display panel to which the array substrate is applied to display an image.

The gate driver is configured to control a level of the gate electrode of the thin film transistor of the display panel. When an image is displayed, the source driver applies a charging voltage to the data line of the display panel, and the gate driver outputs a voltage through a gate line to control the thin film transistor to be turned on or turned off, so as to display the image signal.

To be specific, the gate driver may supply a gate line control signal to the gate lines G1, G2, . . . , Gn progressively. In the process of inputting the control signal to each gate line, the source driver outputs the control signal to each of the data lines D1, D2, . . . , Dn until the control signal has been applied to all the gate lines. At this time, the input of one image has been completed.

In a possible embodiment of the present disclosure, the charging circuitry further includes a TDDI chip coupled to the timer control register TCON 120, and configured to drive the display panel to display an image through the timer control register TCON 120. In addition, the TDDI chip is further configured to identify a touch operation of a touch module on the display panel and a specific touch position. In a possible embodiment of the present disclosure, the TDDI chip and the timer control register TCON 120 may also be integrated.

In this regard, in a display device with the TDDI chip, a touch function and a display function are integrated. Within an output period of each image, it is necessary to allocate a duration for outputting the image and a duration for reading the touch operation. In a possible embodiment of the present disclosure, two touch operation reading processes are spaced apart from each other by a charging period for one or more images. Alternatively, a plurality of touch operation reading processes is distributed within the charging period for one image, and each touch operation reading process is performed after the input of the control signal into one gate line and before the input of the control signal into the other gate line.

Figure 3:
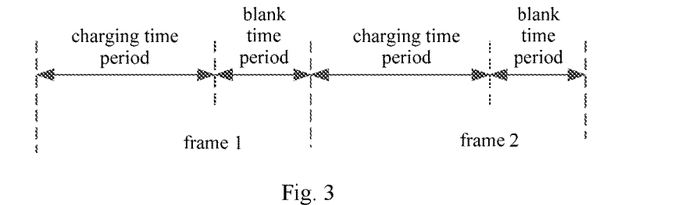
FIG. 3 is a sequence diagram showing the charging of a data line within one frame in the related art.

As shown in FIG. 1 and FIG. 2, when the display device has a refresh rate of 60 HZ, the quantity of gate lines 2 is 360, and a time for inputting the control signal to each gate line is 34.01 μs, in a product with a small size, within a control signal input period for each gate line, a charging time required by the data line 1 is less than 34.01 μs, e.g., 5 μs, so the remaining time is nearly 30 μs. When a charging state is maintained within the charging period, there is such a problem as power consumption. Identically, as shown in FIG. 3, within a control signal input period for each frame, a charging period for the data line 1 includes a charging time period and a blank time period, and an actual charging time length is less than a charging time length of the charging time period. In this regard, within the control signal input period of each gate line and the control signal input period of each frame, when the driving sub-circuitry 100 is maintained in an operation state, there exists the power consumption. Identically, in the charging process, no matter which stage the touch operation reading process is at, when the driving sub-circuitry 100 is also in the operation state in the touch reading process, there also exists the power consumption. Based on above, according to the charging circuitry in the embodiments of the present disclosure, the switch sub-circuitry 300 is arranged on the connection circuitry between the VCC end 200 and the driving sub-circuitry 100, and within each charging period, after the data line 1 has been charged, the driving sub-circuitry 100 is turned off under the control of the switch sub-circuitry 300 for intermittent charging, so as to effectively reduce the power consumption The present disclosure further provides in some embodiments a display device, including an array substrate and the above-mentioned charging circuitry. The array substrate is provided with at least one data line, and the driving sub-circuitry is coupled to the at least one data line of the array substrate.

As shown in FIG. 1 and FIG. 2, according to the display device in the embodiments of the present disclosure, the array substrate includes a plurality of data lines 1 and a plurality of gate lines 2 formed on a substrate (not shown). The plurality of data lines 1 and the plurality of gate lines 2 cross each other to define a plurality of sub-pixel units 3, and a pixel electrode 4 and a thin film transistor 5 are arranged in each sub-pixel unit 3. The thin film transistor 5 includes a gate electrode, a source electrode and a drain electrode, the gate electrode is coupled to the gate line 2, the source electrode is coupled to the data line 1, the drain electrode is coupled to the pixel electrode 4, and a semiconductor layer of the thin film transistor is formed between the source electrode and the drain electrode. The gate line 2 is used to input an ON signal to the thin film transistor, and the data line 1 is used to provide a data signal to the pixel electrode 4.

Based on the above detailed description about the charging circuitry, as shown in FIG. 1 and FIG. 2, the data line 1 is coupled to the output end of the driving sub-circuitry 100, and the driving sub-circuitry 100 is configured to input a voltage driving signal for displaying an image to the data line 1. In addition, the driving sub-circuitry 100 further includes a gate driver coupled to the gate line 2 and configured to apply a voltage through the gate line 2 to control the thin film transistor of the display panel to be turned on or off.

The gate line control signal is supplied to the gate lines G1, G2, . . . , Gn progressively. In the process of inputting the control signals to each gate line, the control signal is inputted to each of the data lines D1, D2, . . . , Dn until the control signal has been inputted to all the gate lines. At this time, the input of one image has been completed.

According to the display device in the embodiments of the present disclosure, the switch sub-circuitry controls the VCC end to be electrically coupled to or electrically decoupled from the driving sub-circuitry. As a result, the driving sub-circuitry may charge the data line of the array substrate and then be turned off within a time period after the data line has been charged, so as to effectively reduce the power consumption.

Based on the above detailed description, a person skilled in the art should understand the specific structure of the display device having the charging circuitry according to the embodiments of the present disclosure, which will thus not be particularly defined herein.

In a possible embodiment of the present disclosure, the display device further includes a TDDI chip.

In a possible embodiment of the present disclosure, the display device includes a built-in touch display module. When the display device is a Liquid Crystal Display (LCD) display device, it further includes a touch layer formed on the array substrate. The touch layer includes a plurality of touch electrodes arranged in an array form, and it is reused as a common electrode. An opposite substrate is arranged at a side of the touch layer away from the array substrate. A touch function is achieved through the touch electrodes. According to the display device in the embodiments of the present disclosure, the touch layer for achieving the touch function is arranged between the array substrate and the opposite substrate, and the display device is provided with an In Cell touch display structure.

In a possible embodiment of the present disclosure, the display device further includes a printed circuit board provided with a driving chip (e.g., a TDDI chip), the array substrate is provided with a touch line and a data line both coupled to the driving chip through a connection structure. Through the driving chip on the printed circuit board, it is able to not only transmit a driving signal to the touch electrode and receive a sensing signal on the touch electrode to achieve the touch function, but also transmit a display signal to the sub-pixel unit to achieve the display function, i.e., it is able to achieve the touch function and the display function through a same printed circuit board.

In a possible embodiment of the present disclosure, the touch layer is a self-capacitance sensing structure configured to detect a change in a capacitance of the touch electrode when a touch operation is made by a finger on the touch electrode, so as to achieve the touch function.

In a possible embodiment of the present disclosure, the common electrode of the array substrate is reused as the touch electrode.

Of course, the above-mentioned structure of the display device is for illustrative purposes only, and the structure of the display device is not limited thereto.

The present disclosure further provides in some embodiments a wearable device including the above-mentioned display device.

The wearable device may be a watch, a pair of glasses or a necklace, and generally it includes a display device and a wearing body coupled to the display device. The display device may be fixed to a part of a human body through the wearing body.

The specific structure of the display device may refer to the above description, and thus will not be particularly defined herein.

Generally, the TDDI chip is applied in the field of mobile phone display. In a possible embodiment of the present disclosure, the wearable device includes the TDDI chip. When the TDD chip is applied to the wearable device, it is able to reduce the manufacture cost. In addition, through the switch sub-circuitry 300, it is able to charge in an intermittent mode, so as to effectively reduce the power consumption of the wearable device and improve a response time.

The present disclosure further provides in some embodiments a display driving method for the above-mentioned display device, so as to control the charging circuitry to perform intermittent charging, thereby to effectively reduce power consumption.

Figure 4:
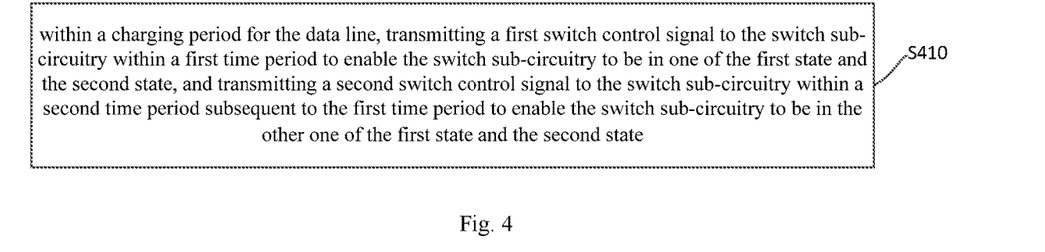
FIG. 4 is a flow chart of a display driving method according to one embodiment of the present disclosure.

As shown in FIG. 4 in conjunction with FIG. 1, the display driving method includes S410 of, within a charging period for the data line, transmitting a first switch control signal to the switch sub-circuitry 300 within a first time period to enable the switch sub-circuitry 300 to be in one of the first state and the second state, and transmitting a second switch control signal to the switch sub-circuitry 300 within a second time period subsequent to the first time period to enable the switch sub-circuitry 300 to be in the other one of the first state and the second state. The first time period and the second time period are consecutive time periods and together form the charging period for the data line.

According to the display driving method in the embodiments of the present disclosure, within the charging period for the data line, the switch sub-circuitry 300 is controlled to be switched between the first state and the second state, so as to enable the charging circuitry to charge in an intermittent mode, thereby to reduce the power consumption.

In a possible embodiment of the present disclosure, the charging period for the data line is a charging period for one gate line of the array substrate, the first switch control signal is used to enable the switch sub-circuitry to be in the second state, and the second switch control signal is used to enable the switch sub-circuitry to be in the first state.

Figure 5:
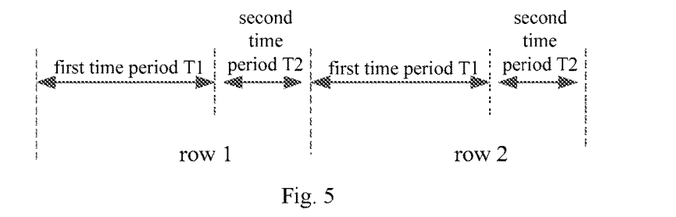
FIG. 5 is a sequence diagram of the display driving method according to one embodiment of the disclosure.

As shown in FIG. 5 in conjunction with FIG. 1 and FIG. 2, in the embodiments of the present disclosure, within a first time period T1, the switch sub-circuitry 300 is turned off, the booster unit 110 and the amplification unit 130 stop operating, and the driving sub-circuitry 100 is in a power saving mode. At this time, the data line continue to maintain the voltage through a matching capacitor. Within a second time period T2, the switch sub-circuitry 300 is turned on, the booster unit 110 and the amplification unit 130 operate, and the driving sub-circuitry 100 is in a charging mode. Hence, within the charging period for one gate line, the display device enters the power saving mode and then enters the charging mode.

In the embodiments of the present disclosure, a time length of the second time period T2 is the same as a charging time length for charging the data line within the charging period for one gate line, i.e., the charging time length merely needs to meet the requirement on charging the data line within the charging period for one gate line, so as to reduce the power consumption.

It should be appreciated that, when the switch sub-circuitry 300 includes an MUX, the VCC end 200 is electrically coupled to the driving sub-circuitry 100 for charging the data line when the MUX is turned on, and the VCC end 200 is electrically decoupled from the driving sub-circuitry 100 when the MUX is turned off. At this time, the display device is in the power saving mode.

Figure 6:
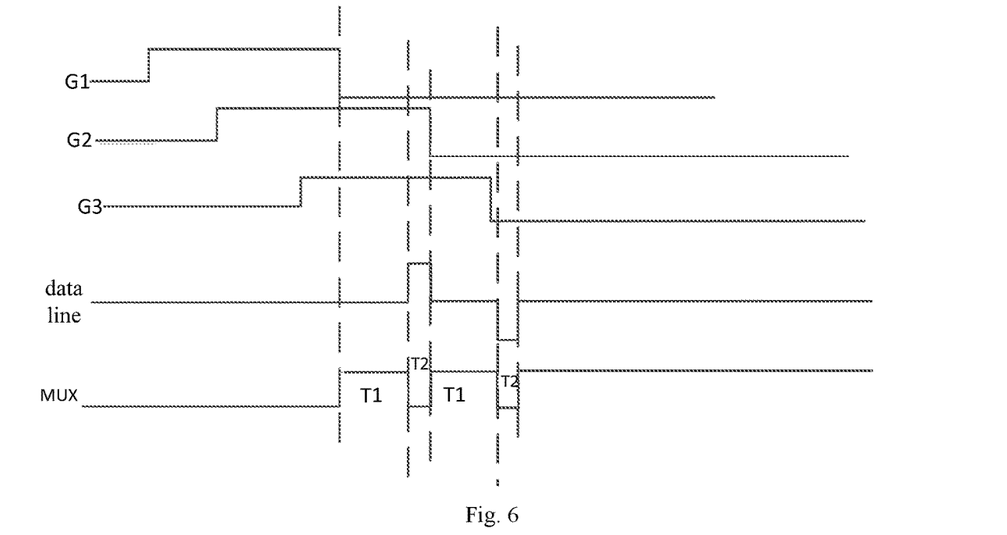
FIG. 6 is a sequence diagram of lines in FIG. 5 according to one embodiment of the disclosure.

Based on the sequence diagram in FIG. 6, within a charging period where the gate line G1 is turned off and the gate line G2 is turned on, when the gate line G2 is turned on, the data line is charged within the charging period. Within the first time period T1, the MUX is turned off, and the booster unit 110 and the amplification unit 130 stop operating, so the display device is in the power saving mode. Within the second time period T2, the MUX is turned on, and the booster unit 110 and the amplification unit 130 operate, so the display device is in a charging mode. Identically, within the charging period corresponding to each energized gate line, the MUX is switched between an on state and an off state based on the above-mentioned rule, so as to perform intermittent charging, thereby to reduce the power consumption.

Within the charging period corresponding to each energized gate line, the display device is in the power saving mode and then in the charging mode, so as to disable the energization of the gate line and the charging of the data line simultaneously within one period, and charge the data line after a previous gate line is completed deenergized, thereby to prevent the occurrence of erroneous charging.

In a possible embodiment of the present disclosure, the charging period for the data line is a charging period for one image of the array substrate, the first switch control signal is used to enable the switch sub-circuitry to be in the first state, and the second switch control signal is used to enable the switch sub-circuitry to be in the second state.

Figure 7:
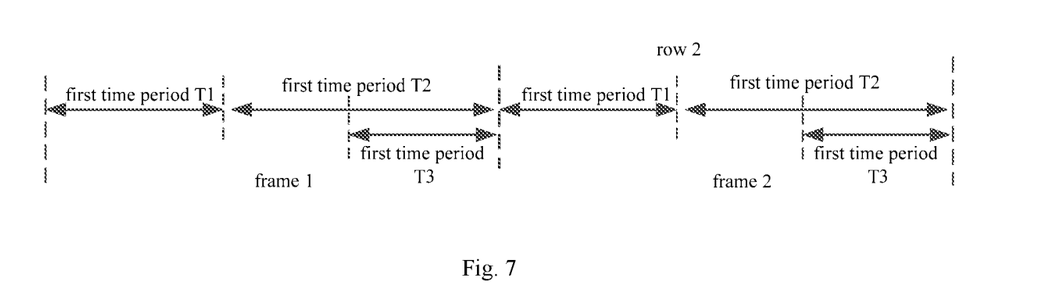
FIG. 7 is another sequence diagram of the display driving method according to one embodiment of the disclosure.

As shown in FIG. 7 in conjunction with FIG. 1 and FIG. 2, within a first time period T1, the switch sub-circuitry 300 is turned on, the booster unit 110 and the amplification unit 130 operate, and the driving sub-circuitry 100 is in a charging mode. Within a second time period T2, the switch sub-circuitry 300 is turned off, the booster unit 110 and the amplification unit 130 stop operating, and the driving sub-circuitry 100 is in a power saving mode. Hence, within the charging period for one image, the display device enters the charging mode and then enters the power saving mode.

In a possible embodiment of the present disclosure, a time length of the first time period T1 is the same as a charging time length from a time when a first gate line of the array substrate starts to be charged to a time when a last gate line of the array substrate has been charged, as long as each gate line is charged within the charging period for one image.

It should be appreciated that, within the second time period T2 of the charging period for one image, although the booster unit 110 and the amplification unit 130 stop operating, there is a time period, i.e., a blank time period T3 in FIG. 7, for data transmission between digital modules including the TCON 120 and the amplification unit 130. In related art, within the blank time period T3, the booster unit 110 and the amplification unit 130 are always in the operation state, so the power consumption is generated. In the embodiments of the present disclosure, within the blank time period T3, the booster unit 110 and the amplification unit 130 do not operate, and no power consumption is generated, i.e., it is able to reduce the power consumption.

Figure 8:
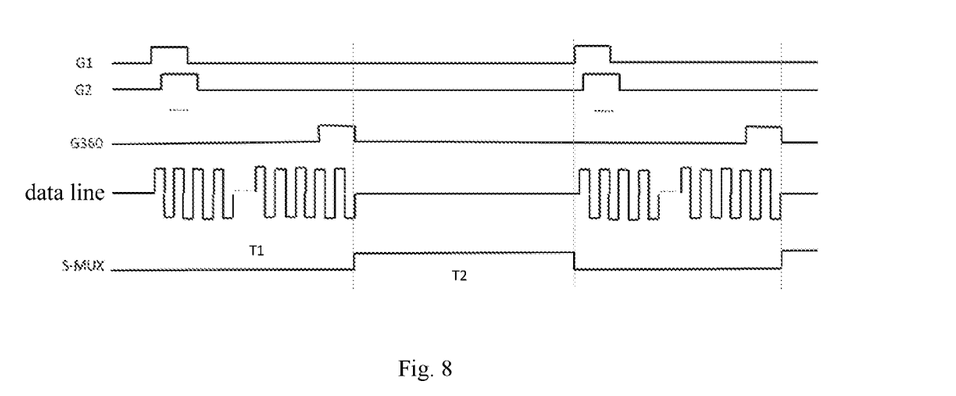
FIG. 8 is a sequence diagram of lines in FIG. 7 according to one embodiment of the disclosure.

In the sequence diagram as shown in FIG. 8, when the switch sub-circuitry 300 includes the MUX, within the first time period T1 of the charging period for one image, the gate lines G1, G2, . . . , G360 are energized in turn, and a predetermined positive voltage and a predetermined negative voltage are applied to the data lines alternately in accordance with a predetermined frequency. At this time, the MUX is turned on, and the booster unit 110 and the amplification unit 130 operate, so the display device is in the charging mode. Within the second time period T2, no signal is applied to the gate line and the data line. At this time, the MUX is turned off, and the booster unit 110 and the amplification unit 130 stop operating, so the display device is in a power saving mode.

Based on the above, according to the display driving method in the embodiments of the present disclosure, a time when the display device is in the power saving mode may be located before or after an image is displayed. The display device may be in the power saving mode within a time period where one gate line is energized or the charging period for one image. The time for the switching between the first time period T1 and the second time period T2 is controllable.

In a possible embodiment of the present disclosure, a time for the switching between an on state and an off state of the MUX may be controlled by the TCON 120 in accordance with the requirement on the performance adjacent of the display device and a charging condition.

Figure 9:
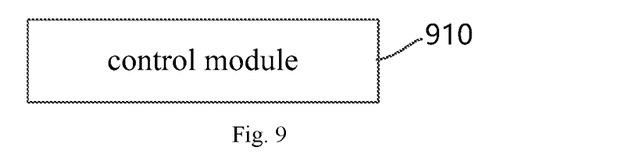
FIG. 9 is a schematic view showing a display driving device according one embodiment of the present disclosure.

The present disclosure further provides in some embodiments a display driving device for the above-mentioned display device. As shown in FIG. 9, the display driving device includes a control module 910 configured to, within a charging period for the data line, transmit a first switch control signal to the switch sub-circuitry within a first time period to enable the switch sub-circuitry to be in one of the first state and the second state, and transmit a second switch control signal to the switch sub-circuitry within a second time period subsequent to the first time period to enable the switch sub-circuitry to be in the other one of the first state and the second state.

In a possible embodiment of the present disclosure, the charging period is a charging period for a gate line of the array substrate, the first switch control signal is used to enable the switch sub-circuitry to be in the second state, and the second switch control signal is used to enable the switch sub-circuitry to be in the first state.

In a possible embodiment of the present disclosure, the charging period is a charging period for an image of the array substrate, the first switch control signal is used to enable the switch sub-circuitry to be in the first state, and the second switch control signal is used to enable the switch sub-circuitry to be in the second state.

In a possible embodiment of the present disclosure, a time length of the first time period is the same as a charging time length from a time when a first gate line of the array substrate starts to be charged to a time when a last gate line of the array substrate has been charged.

In a possible embodiment of the present disclosure, a time length of the second time period is the same as a charging time length for charging the data line within the charging period for one gate line.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A charging circuitry for an array substrate, comprising:
   a driving sub-circuitry configured to receive an image signal and convert the image signal into a display driving signal to be outputted to a data line of the array substrate;
   a circuitry power supply voltage end configured to apply a direct current voltage to the driving sub-circuitry; and
   a switch sub-circuitry arranged on a connection circuitry between the circuitry power supply voltage end and the driving sub-circuitry, and configured to be switched between a first state where the circuitry power supply voltage end is electrically coupled to the driving sub-circuitry and a second state where the circuitry power supply voltage end is electrically decoupled from the driving sub-circuitry.

2. The charging circuitry according to claim 1, wherein the switch sub-circuitry comprises a multiplexer.

3. The charging circuitry according to claim 1, wherein the driving sub-circuitry comprises:
   a booster unit coupled to the switch sub-circuitry, and configured to receive a voltage applied by the circuitry power supply voltage end and convert the voltage applied by the circuitry power supply voltage end into a predetermined voltage when the switch sub-circuitry is in the first state;
   a timer control register configured to receive the image signal and convert the image signal into a timer control signal; and
   an amplification unit comprising an output end and at least two input ends, the booster unit and the timer control register being coupled to the input ends respectively, and the amplification unit being configured to amplify the timer control signal outputted by the timer control register when a voltage applied by the booster unit is the predetermined voltage, so as to enable the output end to output the display driving signal.

4. The charging circuitry according to claim 3, wherein the timer control register is coupled to the switch sub-circuitry, and further configured to transmit a switch control signal to the switch sub-circuitry to enable the switch sub-circuitry to be switched between the first state and the second state in accordance with the switch control signal.

5. The charging circuitry according to claim 3, further comprising a feedback unit coupled to the output end of the amplification unit and one input end of the amplification unit.

6. A display device, comprising an array substrate and a charging circuitry, wherein the charging circuitry comprises:
   a driving sub-circuitry configured to receive an image signal and convert the image signal into a display driving signal to be outputted to a data line of the array substrate;
   a circuitry power supply voltage end configured to apply a direct current voltage to the driving sub-circuitry; and
   a switch sub-circuitry arranged on a connection circuitry between the circuitry power supply voltage end and the driving sub-circuitry, and configured to be switched between a first state where the circuitry power supply voltage end is electrically coupled to the driving sub-circuitry and a second state where the circuitry power supply voltage end is electrically decoupled from the driving sub-circuitry,
   wherein the array substrate is provided with at least one data line, and the driving sub-circuitry is coupled to the at least one data line of the array substrate.

7. A wearable device, comprising the display device according to claim 6.

8. A display driving method for the display device according to claim 6, comprising, within a charging period for the data line, transmitting a first switch control signal to the switch sub-circuitry within a first time period to enable the switch sub-circuitry to be in one of the first state and the second state, and transmitting a second switch control signal to the switch sub-circuitry within a second time period subsequent to the first time period to enable the switch sub-circuitry to be in the other one of the first state and the second state.

9. The display driving method according to claim 8, wherein the charging period is a charging period for a gate line of the array substrate, the first switch control signal is used to enable the switch sub-circuitry to be in the second state, and the second switch control signal is used to enable the switch sub-circuitry to be in the first state.

10. The display driving method according to claim 8, wherein the charging period is a charging period for an image of the array substrate, the first switch control signal is used to enable the switch sub-circuitry to be in the first state, and the second switch control signal is used to enable the switch sub-circuitry to be in the second state.

11. The display driving method according to claim 10, wherein a time length of the first time period is the same as a charging time length from a time when a first gate line of the array substrate starts to be charged to a time when a last gate line of the array substrate has been charged.

12. The display driving method according to claim 9, wherein a time length of the second time period is the same as a charging time length for charging the data line within the charging period of a gate line.

13. A display driving device for the display device according to claim 6, comprising a control module configured to, within a charging period for the data line, transmit a first switch control signal to the switch sub-circuitry within a first time period to enable the switch sub-circuitry to be in one of the first state and the second state, and transmit a second switch control signal to the switch sub-circuitry within a second time period subsequent to the first time period to enable the switch sub-circuitry to be in the other one of the first state and the second state.

14. The display device according to claim 6, wherein the switch sub-circuitry comprises a multiplexer.

15. The display device according to claim 6, wherein the driving sub-circuitry comprises:
   a booster unit coupled to the switch sub-circuitry, and configured to receive a voltage applied by the circuitry power supply voltage end and convert the voltage applied by the circuitry power supply voltage end into a predetermined voltage when the switch sub-circuitry is in the first state;
   a timer control register configured to receive the image signal and convert the image signal into a timer control signal; and
   an amplification unit comprising an output end and at least two input ends, the booster unit and the timer control register being coupled to the input ends respectively, and the amplification unit being configured to amplify the timer control signal outputted by the timer control register when a voltage applied by the booster unit is the predetermined voltage, so as to enable the output end to output the display driving signal.

16. The display device according to claim 15, wherein the timer control register is coupled to the switch sub-circuitry, and further configured to transmit a switch control signal to the switch sub-circuitry to enable the switch sub-circuitry to be switched between the first state and the second state in accordance with the switch control signal.

17. The display device according to claim 15, wherein the charging circuitry further comprises a feedback unit coupled to the output end of the amplification unit and one input end of the amplification unit.

\* \* \* \* \*